Sept. 2, 1924.  
W. MEINERSMANN  
1,507,394  
METHOD AND APPARATUS FOR OBTAINING SAMPLES  
Filed Jan. 8, 1921 3 Sheets-Sheet 1

INVENTOR  
William Meinersmann  
BY  
HIS ATTORNEY

Sept. 2, 1924.

W. MEINERSMANN

METHOD AND APPARATUS FOR OBTAINING SAMPLES

Filed Jan. 8, 1921

INVENTOR
William Meinersmann
BY
HIS ATTORNEY

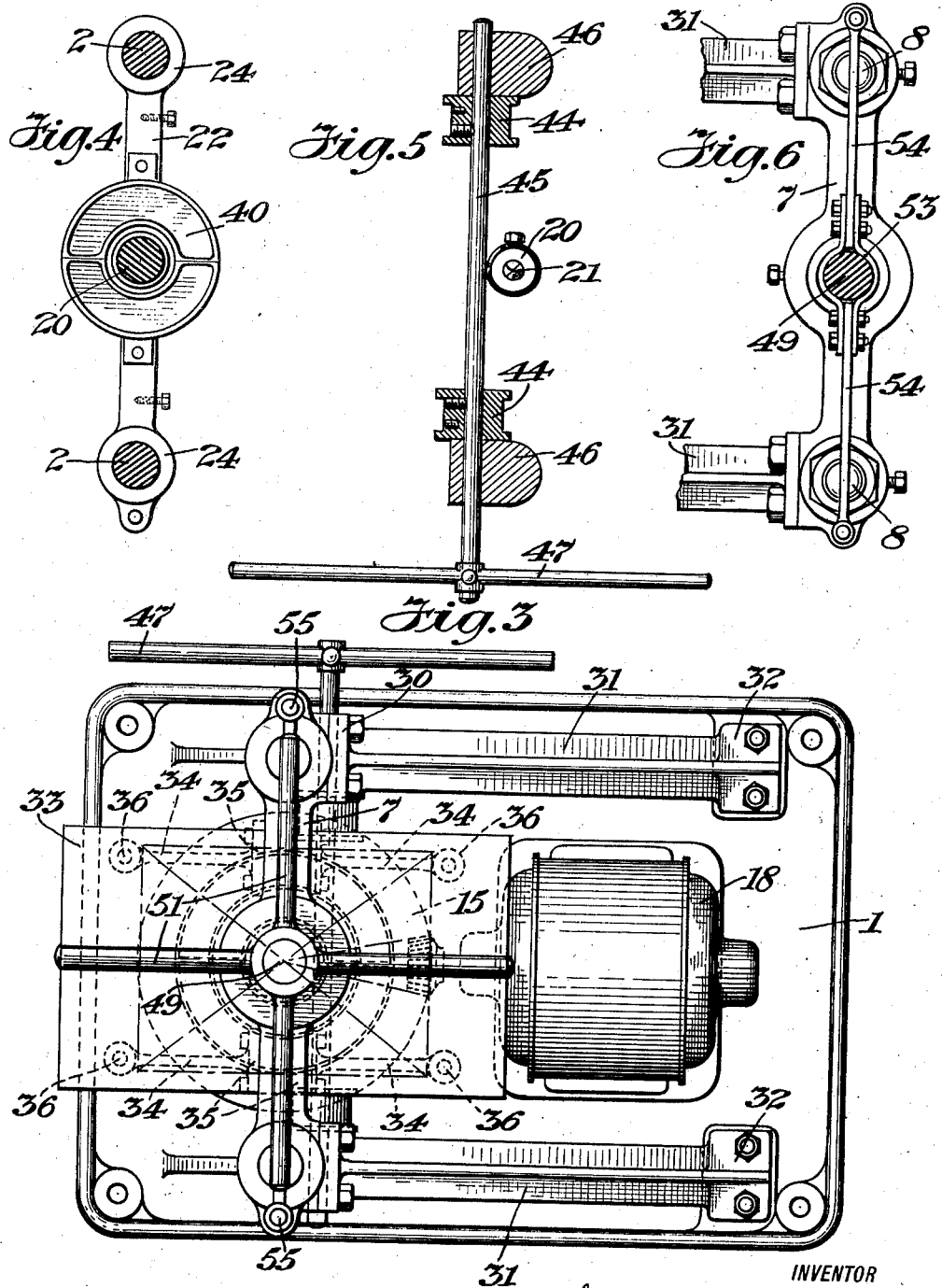

Patented Sept. 2, 1924.

1,507,394

UNITED STATES PATENT OFFICE.

WILLIAM MEINERSMANN, OF ELIZABETH, NEW JERSEY.

METHOD AND APPARATUS FOR OBTAINING SAMPLES.

Application filed January 8, 1921. Serial No. 435,839.

*To all whom it may concern:*

Be it known that I, WILLIAM MEINERSMANN, a citizen of the United States, and resident of Elizabeth, in the county of Union and State of New Jersey, have invented a certain new and useful Method and Apparatus for Obtaining Samples, of which the following is a specification.

This invention relates to an improved method and apparatus for the obtaining of samples to be used in the analyzing of material, such as tin scrap, galvanized scrap, and the like, in an expeditious and satisfactory manner, whereby more reliable and accurate results will be obtained than were possible of attainment by the former practice.

Heretofore the method of sampling a quantity of tin scrap or similar material consisted of selecting, say, for example, approximately 20 lbs. thereof from different portions of the container in which the scrap was shipped, and using these selected portions as representative samples of that particular shipment. These samples were dissolved in acid and the resultant product analyzed for the purpose of obtaining the percentage of the various metals contained therein.

This method presents various disadvantages, in that large quantities of acid were required to dissolve the necessarily large sample, and in view of the few pieces required to make up the representative sample, it was a comparatively easy matter to manipulate the final results, according to the will of the sampler.

As an improved method over the one hereinbefore stated, and to overcome the disadvantages enumerated, another method employed was to select small samples, picked from the various parts of the container, and compress the same into a compact bundle or briquet, and thereafter drill through the briquetted sample in several places, using the drillings or borings as the final representative sample.

The disadvantage in this latter method is that the drill, in cutting through the different layers of scrap, causes a portion of the chips or borings to rotate with the drill and thereby wedge the small chips within the crevices of the scrap, and also cause the surface of the larger chips, to a certain extent, to be rubbed off, which necessarily results in the obtaining of incorrect samples.

The present invention has for its particular object the overcoming of the various disadvantages of the methods hereinbefore enumerated, and in the broader aspects thereof, resides in a method and apparatus wherein the drilling operation is employed, but the apparatus is so constructed that the drill is driven in an inverted position, whereby the chips or borings will fall out of the hole and clear the drill as soon as they are cut, necessary means being provided for catching or collecting the borings as they fall during the drilling process.

In carrying out this invention, the method of obtaining an analysis of a shipment of material, in connection with the machine therein employed, consists in picking out a large average sample from the material to be analyzed, compressing the same into a bundle or briquet, and then clamping it in proper position in the machine, to be bored or drilled in the manner hereinbefore stated, said clamp acting as an additional press.

By this arrangement, a further object will be obtained in that all possibility of picking out samples to suit the will of the sampler will be eliminated, as the large so-called average sample will permit the use of a substantial portion of all kinds of scrap, for the reason that a larger aggregate sample can be used than is practicable with the acid method, permitting the said sample to be drilled through at several different portions of the bundle, and the resulting chips or borings obviously producing a fairer and more nearly average sample.

Another object of the invention is to secure a smaller and more average sample from billeted detinned scrap and the like, and other tightly compressed material, without the usual great expenditure of time and labor in ripping these billets apart, and obviously with the aid of the present machine this expenditure of labor is practically eliminated and a better sample obtained in a much shorter time.

Still another and important object is the elimination of the expense incident to the method in which a large sample, requiring a large amount of acid to dissolve the same, was employed, as the borings or drillings are much less in weight compared with such large sample, yet, at the same time, represent a more correct average sample of the material under analysis.

As illustrating the preferred embodiment of the apparatus for carrying out the present invention, reference is had to the accompanying drawings, in which—

Fig. 3 is a plan view, and

Figure 1:
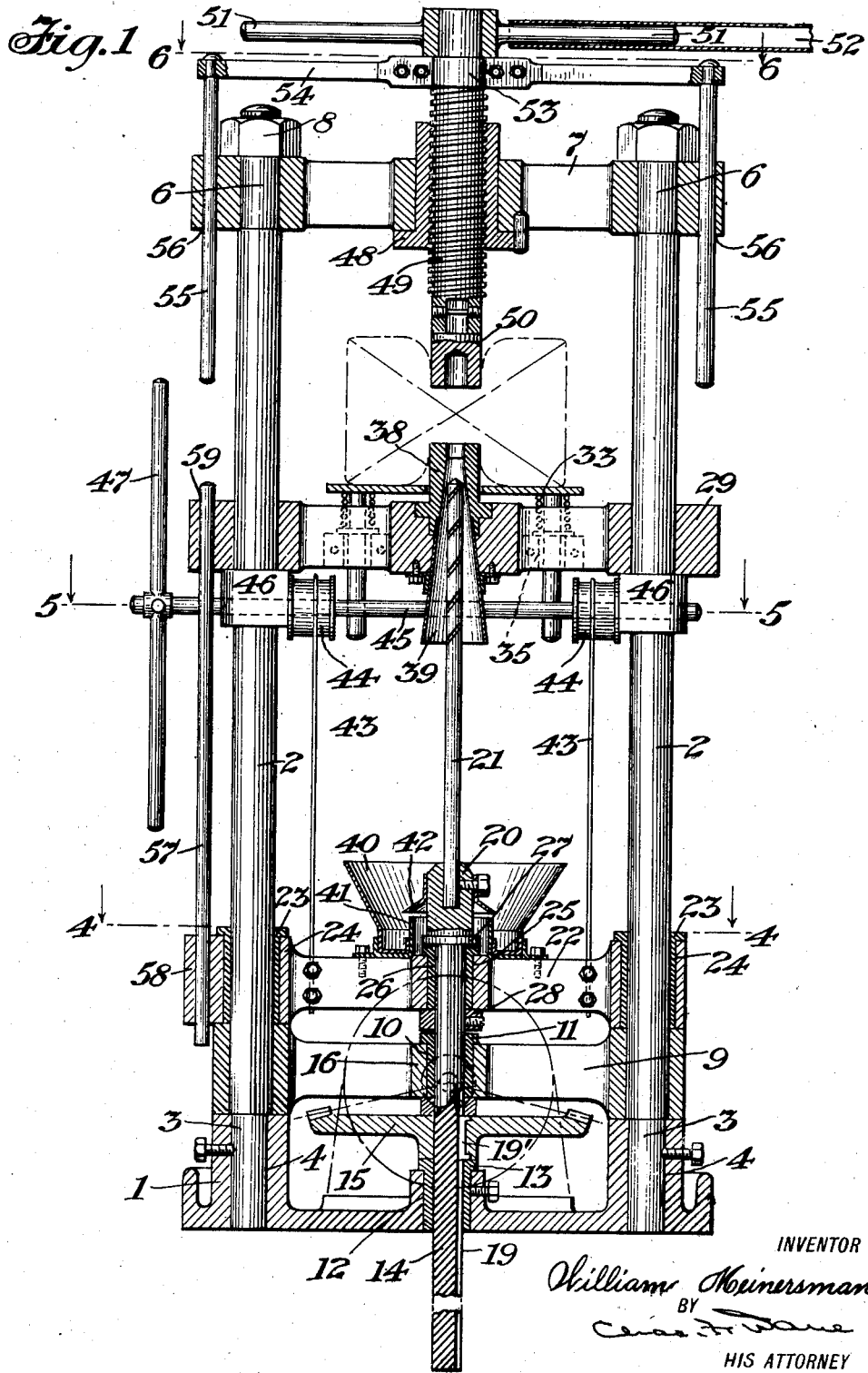
Fig. 1 is a view, partly in elevation and partly in section, of the complete apparatus.

Figs. 4, 5 and 6 are horizontal, sectional views thereof, on lines 4—4, 5—5, and 6—6, respectively, of Fig. 1.

Referring to the drawings in detail, the improved apparatus comprises a main supporting base 1, and vertically disposed parallel standards 2 having their lower ends 3 slightly reduced and securely positioned in sockets 4 formed on the base 1. The upper ends of the standards 2 are likewise reduced, as at 6, for the reception of a cross-head member 7, secured in proper position by nuts or the like 8. The lower ends of said standards 2 are further connected by a cross-member 9 positioned thereon immediately above the sockets 4 of the base 1, and the intermediate portion of said cross-member 9 is provided with an opening 10, adapted to receive a bearing 11, for a purpose to be hereinafter more fully described. Directly below the opening 10 of the cross-member 9 is a corresponding opening 12 formed in the base 1, for supporting a similar bearing 13. Rotatably supported within these bearings 11 and 13, and also having a vertical movement therein, is a shaft 14 keyed to a beveled gear 15, which gear is in mesh with an appropriate beveled gear or pinion 16, preferably mounted upon the shaft 17 of an electric motor 18, through which train of gears and operating motor the vertically movable shaft 14 is adapted to be rotated during the operation of the apparatus.

To permit the vertical movement of the shaft 14, said shaft is provided with a longitudinal key slot 19, engaged by a key 19′. The upper end of the shaft 14 is provided with an enlarged head 20 forming a socket for the spindle of the drill 21, so that the shaft 14 will carry the drill with it during the elevating and lowering of said shaft.

Mounted for vertical reciprocatory movement on the standards 2 above the cross-member 9, is a cross-head 22, having end bearings 24 provided with bushings 23 engaging the standards 2. The reciprocating cross-head 22 is provided with a central opening 25 having a bushing 26 to receive the shaft 14. The shaft 14, while freely rotatable in the bearing 25 in the cross-head 22, is secured to said cross-head to partake of the vertical movement of the latter in advancing the drill to and retracting the same from the work. To this end the enlarged upper end of the shaft 14 is provided with a flange 27 engaging the corresponding flange on the bushing 26 and a clamping ring 28 secured to the shaft 14 immediately below the cross-head 22.

Figure 2:
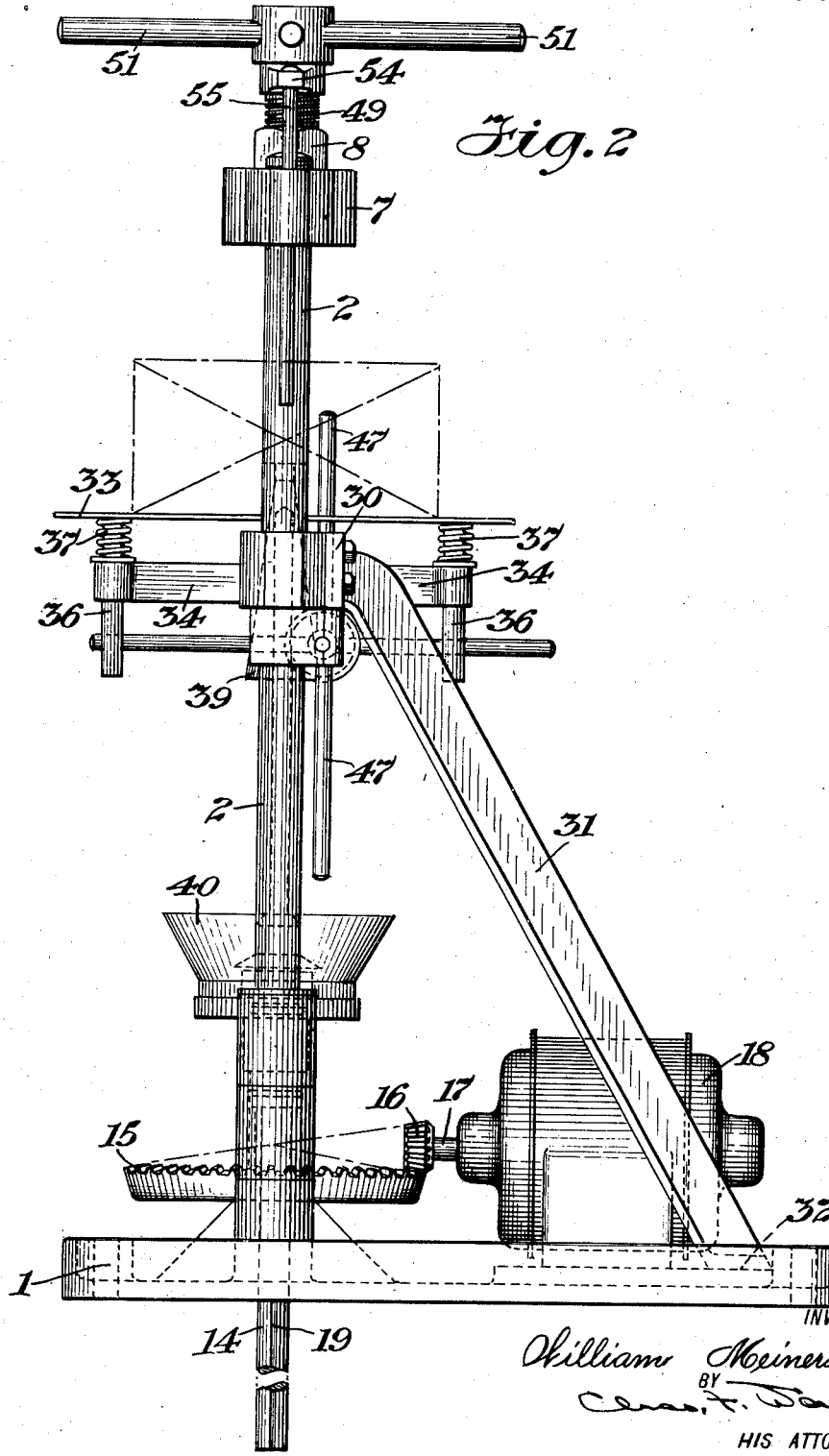
Fig. 2 is a view in side elevation, showing the preferred means of rotating the drill.

Positioned between the cross-head 7 and the reciprocating cross-head 22, is an intermediate cross-head or yoke 29, to which is secured at 30 a pair of angularly disposed braces 31, the lower ends of which are secured to the base 1, as at 32. The cross-head or yoke 29 not only forms a brace or support for the standards 2, in conjunction with the angularly disposed braces 31, but also supports a platform or plate 33 by means of a series of bracket-arms 34, properly attached to said cross-member 29, as at 35. The outer ends of the arms 34 are provided with vertically disposed openings for the reception of pins or legs 36 attached to and depending from the platform or plate 33, between the bottom of which plate and the bracket-arms 34, and encircling the legs 36, are arranged cushioning springs 37, as clearly shown in Fig. 2.

The intermediate portion of the cross-head or yoke 29 is provided with a recess carrying a conical, removable bushing 38, for the purpose of centering or guiding the drill 21 during the drilling operation, which bushing projects upwardly and extends through an opening centrally arranged in the platform or plate 33, engaging the lower side of the briquetted sample adapted to be positioned on said platform or plate 33. As a continuation of the bushing 38, projecting downwardly and extending below the cross-member or yoke 29, is a conical tube 39, for preventing the dispersion of the borings or chips as they fall from the drill during the boring operation.

Directly below the conical tube 39, and positioned upon the reciprocating cross-head 22, is an outwardly flared receptacle or cup 40, for the purpose of receiving and retaining the borings or drillings from the conical tube 39. The receptacle 40 is provided with a central opening adapted to fit over an upstanding collar 41 secured to the reciprocating cross-head 22, said collar surrounding the enlarged upper end 20 of the shaft 14. In order to prevent the borings or chips from entering the space between the upstanding collar 41 and the enlarged upper end of the shaft 14, there is provided a conical deflector 42, surrounding and secured to the drill socket 20, and having its lower end projecting downwardly and overhanging the upper edge of the upstanding collar 41.

In the preferred construction of the cup or receptacle 40, the same is constructed of two matched half-sections, in order to facilitate the removal of the cup from its supported position whenever desired for discharging the chips or borings.

As hereinbefore stated, the cross-head 22 is mounted on the standards 2 for reciprocatory movement, for the purpose of feeding the drill into and backing the same out of the briquetted sample. To accomplish the elevating of said reciprocatory cross-head, the same is provided with cables 43, each having one end secured by appropriate fastenings to said cross-head and the other end secured to and adapted to be wound upon a corresponding drum 44, carried by a shaft 45, mounted for rotation in supporting journals 46, secured to the standards 2 immediately below the intermediate cross-head or yoke 29, as clearly shown in Fig. 1. One end of the shaft 45 is provided with windlass bars or lever arms 47, for the purpose of manually rotating the shaft 45, and, through the cable and windlass arrangement, elevating the reciprocating cross-head 22, as desired, during the drilling operation. The weight of said cross-head serves to lower the same and bring the drill out of the briquetted sample upon the completion of the boring operation.

For the purpose of clamping the briquetted sample in position upon the platform or plate 33, the cross-head 7 supports a threaded bushing 48, in which is carried a screw 49 having attached at its lower end a recessed head 50, and at its upper end lever arms 51 for the purpose of operating said screw, the latter constituting a screw plunger cooperating with the upper end of the conical bushing 38, the spring mounting of the platform 33 permitting this action. In order to increase the power and lever action in connection with the screw 49, a tubular sleeve 52 may be used in conjunction with the various lever arms 51.

Projecting outwardly in diametrically opposite directions from the upper end of the screw 49, is a pair of arms 54 carrying at their outer ends gauge rods 55, said rods passing downwardly through and guided by openings 56 formed in the outer ends of the cross-head member 7. It will be noted that these rods 55 are of such length that their lower ends are in line with the lower recessed end 50 of the screw 49. Cooperating with one of the rods 55 is a gauge rod 57, the lower end of which is rigidly secured in an extension 58 on one of the outer ends of the reciprocating cross-head 22. The upper end of this rod 57 passes through and is guided by a vertically disposed opening 59 formed in one of the outer ends of the intermediate cross-head or yoke 29. The extreme upper end of the rod 57 is of the same height as the upper end of the drill 21, so that the rod 57 will at all times indicate the position of the drill and the extent of its penetration into the sample during the boring operation. The rods 55 and 57 are positioned in direct alignment, and, by reason of the relation of the rods with respect to the screw and the drill, the touching or engaging of the ends of said rods will at all times indicate the limit of penetration.

It is to be understood that, although the drawings show the bundle or briquet in one position only, the position thereof may be changed by withdrawing the screw 49, shifting the briquet, and again clamping the same, so that a number of borings or drillings can be obtained from each briquet.

With the construction of apparatus as above indicated, the chips and borings will free themselves from the drill and drop by gravity into the cup or receptacle 40, being directed thereinto by the conical tube 39.

From the foregoing description, in conjunction with the accompanying drawings, the various advantages of the present apparatus, and the method of obtaining a more accurate sample of the material under analysis, will be readily understood and appreciated by those skilled in the art to which the invention relates, and while the principle of operation, together with the device, is considered to be the preferred embodiment of the invention, it is to be understood that the particular device shown is merely illustrative, and that such changes may be made as may be found necessary or desirable within the scope of the appended claims.

What I claim is:

1. In an apparatus of the class described, the combination with a piercing element, of means for supporting substantially loose material to be operated upon above said element, means for locally compressing said material at the section through which said piercing element is to pass, and means for operating said piercing element.

2. In an apparatus of the class described, the combination with a piercing element, of means for supporting substantially loose the material to be operated upon above said element, means for locally compressing said material at the section through which said piercing element is to pass, means for operating said piercing element, and means for recovering the portions pierced from said material.

3. In an apparatus of the class described, the combination with a cutting element, of means for supporting substantially loose the material to be operated upon above said element, means for locally compressing said material at the section through which said cutting element is to pass, means for operating said cutting element, and means for recovering the cuttings resulting from said cutting operation.

4. In an apparatus of the class described, the combination with a drill, of a platform or plate mounted above said drill adapted to support substantially loose material to be drilled, means for locally compressing said material at the section through which the drill is to pass, means for rotating and means for elevating said drill, and means for recovering the borings or drillings resulting from the boring operation.

5. In an apparatus of the class described, the combination with a drill, of a platform or plate mounted above said drill adapted to support substantially loose the material to be drilled, means for locally compressing said material at the section through which the drill is to pass, means for rotating and means for elevating said drill, means for guiding and maintaining the upper end of the drill in operative position adjacent the point of compression, said guiding means forming a part of the compressing means, and means for recovering the borings or drillings resulting from the boring operation.

6. In an apparatus of the class described, the combination with a drill, of a supporting member or yoke mounted above the drill, provided with an opening through which the upper end of said drill is adapted to be guided and maintained in operative position, a platform or plate mounted on said supporting member or yoke for supporting substantially loose material to be drilled, means for locally compressing said material at the section to be pierced by the drill, a reciprocating member for rotatably supporting said drill, means for elevating said reciprocating member, means for rotating the drill, and means for recovering the borings or drillings resulting from the drilling operation.

7. In an apparatus of the class described, the combination with vertical standards and a supporting base, of a reciprocating member, an upper cross-head, and an intermediate member or yoke mounted upon said vertical standards, a piecing element carried by said reciprocating member, said intermediate member or yoke provided with an opening through which the upper end of said piercing element is adapted to pass, a platform or plate mounted on said intermediate member above the piercing element for supporting substantially loose material to be drilled, a screw plunger carried by said upper cross-head member for compressing the material at a point to be pierced, a guide for said drill forming a cooperating part of said compression arrangement, and means for elevating said reciprocating member.

8. In an apparatus of the class described, the combination with vertical standards and a supporting base, of a reciprocating member, an upper cross-head, and an intermediate member or yoke mounted upon said vertical standards, a drill rotatably carried by said reciprocating member, said intermediate member or yoke provided with an opening through which the upper end of said drill is adapted to pass, a platform or plate mounted on said intermediate member above the drill for supporting substantially loose material to be drilled, a screw plunger carried by said upper cross-head member for compressing the material at a point to be pierced by the drill, winding cables for elevating said reciprocating member, means for rotating the drill, and means for gauging the extent of penetration of said drill.

9. In an apparatus of the class described, the combination with a pair of vertical standards and a supporting base, of a reciprocating member, an upper cross-head, and an intermediate member or yoke mounted upon said vertical standards, a drill rotatably carried by said reciprocating member, a tapered opening through said intermediate member or yoke, an upwardly extending tapered bushing forming a continuation of said opening through which the upper end of said drill is adapted to be guided and maintained in operative position, a platform or plate mounted on said yoke surrounding the upwardly extending portion of said bushing for supporting substantially loose material to be drilled, a screw plunger carried by said upper cross-head, the lower end of said plunger cooperating with the upwardly extending bushing for compressing the material at the point to be pierced by the drill, winding cables for elevating said reciprocating member, a motor and suitable gearing for rotating said drill, a cup or receptacle positioned on the reciprocating member surrounding the base of the drill for receiving the borings or drillings, and means for gauging the extent of penetration of said drill.

10. A method of obtaining an average sample of miscellaneous loose material, comprising compressing said material in a restricted area, piercing the same at the area of compression while said material is still under compression, and recovering the portions pierced from said material.

11. A method of obtaining an average sample of miscellaneous loose material, comprising compressing said material at various localized areas, drilling the same through at the areas of compression while said material is still under compression, and recovering the drillings or borings.

12. A method of obtaining an average sample of miscellaneous loose material, comprising compressing said material in a restricted area, drilling upwardly therethrough at the area of compression, and recovering the drillings or borings as they fall.

Signed at Chrome in the county of Middlesex and State of New Jersey, this fifth day of January A. D. 1921.

WILLIAM MEINERSMANN.